US012747696B2

(12) United States Patent
Gravina

(10) Patent No.: US 12,747,696 B2
(45) Date of Patent: Sep. 29, 2026

(54) TURBINE ENGINE AND LUBRICANT RESERVOIR FOR PLANETARY GEARBOX

(71) Applicant: GE Avio S.r.l., Rivalta di Torino (IT)

(72) Inventor: Michele Gravina, Milan (IT)

(73) Assignee: GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 19/192,803

(22) Filed: Apr. 29, 2025

(65) Prior Publication Data

US 2025/0361834 A1 Nov. 27, 2025

(30) Foreign Application Priority Data

May 22, 2024 (IT) ........................ 102024000011548

(51) Int. Cl.
*F02C 7/06* (2006.01)
*F02C 7/36* (2006.01)

(52) U.S. Cl.
CPC .................. *F02C 7/06* (2013.01); *F02C 7/36* (2013.01); *F05D 2260/40311* (2013.01); *F05D 2260/98* (2013.01)

(58) Field of Classification Search
CPC ...... F01D 25/16; F01D 25/162; F01D 25/164; F01D 25/18; F01D 25/183; F01D 25/20; F05D 2260/403; F05D 2260/4031; F05D 2260/40311; F05D 2260/98; F02C 7/06; F02C 7/36
See application file for complete search history.

(56) References Cited

U.S. PATENT DOCUMENTS 5,107,676 A * 4/1992 Hadaway ............ F16H 57/0482 60/39.08
8,450,888 B2 5/2013 Shafer et al.
8,485,222 B2 7/2013 Restivo et al.
(Continued)

FOREIGN PATENT DOCUMENTS

EP 3106714 B1 3/2018

OTHER PUBLICATIONS

Italy Patent Office Search Report for Application No. 102024000011548 dated Dec. 18, 2024 (10 pages with English Translation).

*Primary Examiner* — Nathaniel E Wiehe
*Assistant Examiner* — Jason G Davis
(74) *Attorney, Agent, or Firm* — Venable LLP; Michele V. Frank

(57) ABSTRACT

A turbine engine includes a fan section including a fan, a fan shaft coupled to the fan, a turbine section including an input shaft, and a planetary gear assembly coupled to the input shaft and the fan shaft. The turbine engine further includes a lubricant transfer unit having a reservoir that has a body, a plurality of sectors angularly positioned about a circumference of the body, a plurality of dams positioned between and defining each of the plurality of sectors, at least one orifice that fluidly couples the plurality of sectors to the planetary gear assembly, and at least one opening to evacuate excess lubricant from each of the plurality of sectors. The reservoir is mounted on the fan shaft of the turbine engine, and the excess lubricant drained from the at least one opening of each of the plurality of sectors lubricates the fan shaft.

20 Claims, 7 Drawing Sheets

(56) References Cited

U.S. PATENT DOCUMENTS

| | | | | |
|---|---|---|---|---|
| 8,985,278 | B2 * | 3/2015 | Xu .......................... | F01D 25/20 184/6.11 |
| 9,644,541 | B2 | 5/2017 | Morreale et al. | |
| 9,995,176 | B2 | 6/2018 | Belmonte et al. | |
| 10,107,142 | B2 | 10/2018 | Mastro et al. | |
| 10,550,723 | B2 * | 2/2020 | Gedin ................. | F16H 57/0427 |
| 10,663,054 | B2 | 5/2020 | Gravina et al. | |
| 11,174,756 | B2 | 11/2021 | Venter et al. | |
| 11,215,078 | B2 | 1/2022 | Menczykalski et al. | |
| 2015/0377066 | A1 | 12/2015 | Duong et al. | |
| 2019/0101024 | A1 | 4/2019 | Gravina | |
| 2023/0272751 | A1 | 8/2023 | Yamarthi et al. | |
| 2023/0392555 | A1 | 12/2023 | Martin et al. | |

* cited by examiner

TURBINE ENGINE AND LUBRICANT RESERVOIR FOR PLANETARY GEARBOX

CROSS REFERENCE TO RELATED APPLICATION

The present application claims the priority benefit of Italy Patent Application No. 102024000011548 entitled "Turbine Engine and Lubricant Reservoir for Planetary Gearbox" and filed May 22, 2024, the entire contents of which is hereby incorporated by reference herein.

TECHNICAL FIELD

The present specification generally relates to turbine engines and, more specifically, to reservoirs for lubricating a planetary gearbox of a turbine engine.

BACKGROUND

Planetary gearboxes are commonly used in a wide range of machinery, such as turbine engines, and offer advantages in terms of torque transmission and compactness. However, it is often difficult to ensure continuous and effective lubrication of the various gears and bearings of traditional planetary gearboxes, which aids in maintaining operational efficiency of the gearbox and avoiding premature wear and/or failure. In particular, gearboxes using traditional lubrication systems are susceptible to failure under certain conditions, such as negative-g maneuvers and/or during prolonged windmilling scenarios. Accordingly, a need exists for a lubrication system including a reservoir that provides a reliable and high-capacity lubricant source for a planetary gearbox.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
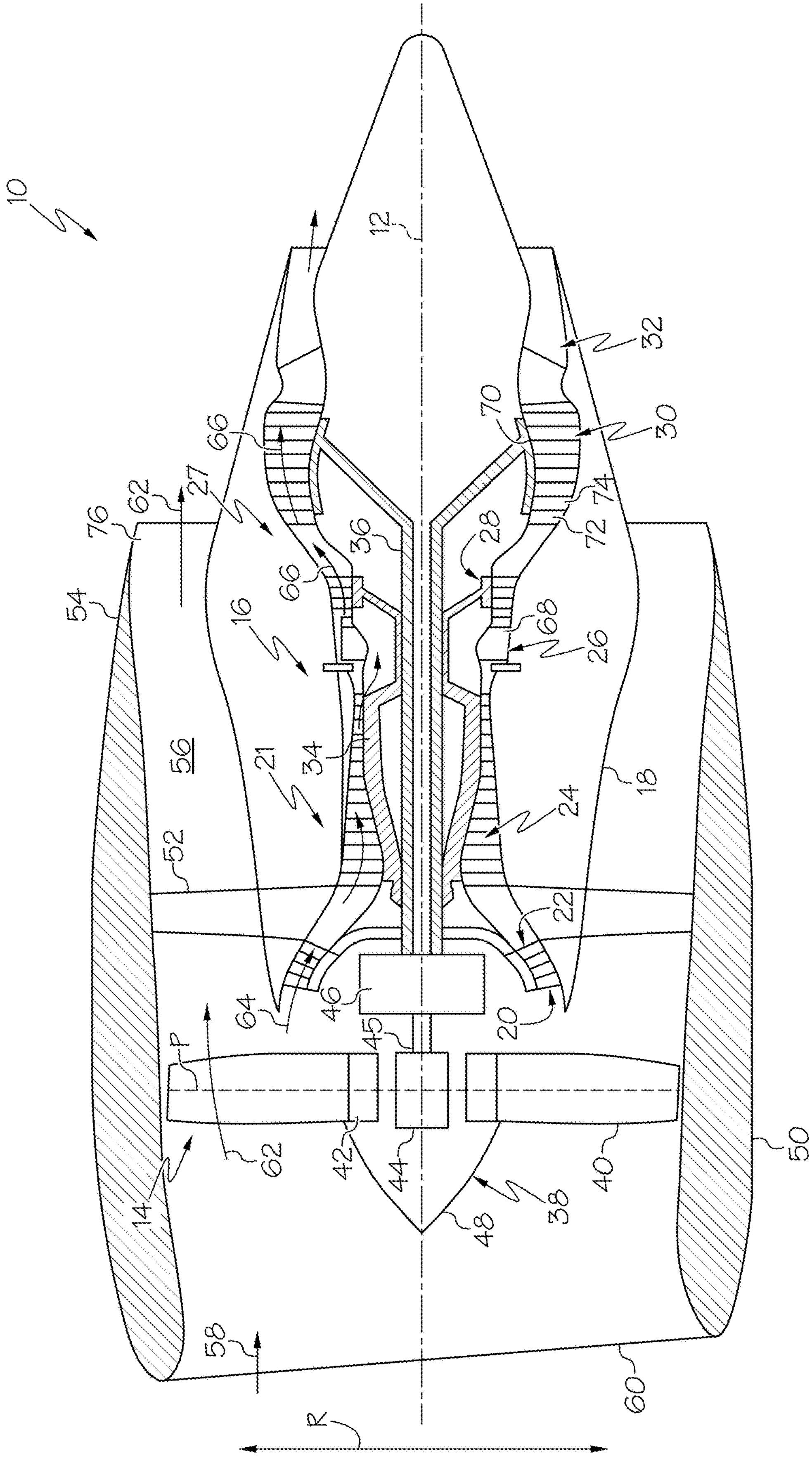
FIG. 1 schematically depicts a cross-sectional diagram of a turbine engine, taken along a centerline axis of the turbine engine, according to an embodiment of the present disclosure.

Embodiments described herein are directed to turbine engines, reservoirs for lubricating gearboxes, and methods of supplying lubrication to a gearbox of a turbine engine. The reservoir includes a body and a plurality of sectors angularly positioned about a circumference of the body. Each of the plurality of sectors includes at least one orifice that fluidly couples the plurality of sectors to the planetary gear assembly and at least one opening that evacuates excess lubricant from each of the plurality of sectors. A plurality of dams are positioned between and define each of the plurality of sectors. The reservoir is mounted on a fan shaft of the turbine engine. In these embodiments, the at least one opening in each of the plurality of sectors may be positioned at different radial heights in order to fill each of the plurality of sectors and ensure a gradual emptying of each of the plurality of sectors in the event of a loss of lubricant supply.

As described herein, conventional reservoirs, particularly those used in connection with planetary gear assemblies, often struggle to provide consistent lubrication under varied operational speeds, such as, negative-g maneuvers, or during windmilling scenarios. Furthermore, in the event of a failure, traditional reservoirs are incapable of supplying emergency lubrication to the gearbox, which can lead to failure of the entire turbine engine.

The disclosed reservoirs aim to address the shortcoming of traditional reservoirs by providing a dynamic, rotating reservoir that allows for effective lubrication of various components by leveraging centrifugal force. Various embodiments of turbine engines, reservoirs, and methods of lubricating a gearbox are described in more detail herein. Whenever possible, the same reference numerals will be used throughout the drawings to refer to the same or like parts.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 is a schematic cross-sectional diagram of a turbine engine 10, taken along a centerline axis of the turbine engine 10, according to an embodiment of the present disclosure. As shown in FIG. 1, the turbine engine 10 defines an axial direction A (extending parallel to a longitudinal, centerline axis 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or spool drivingly connects the HP turbine 28 to the HP compressor 24 to rotate the HP turbine 28 and the HP compressor 24 in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36 to a more efficient rotational fan speed.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flow path, or, more specifically, into the annular inlet 20 of the LP compressor 22. The ratio between the first portion of air 62 and the second portion of air 64 is commonly known as a bypass ratio. The pressure of the second portion of air 64 is then increased as the second portion of air 64 routed through the HP compressor 24 and into the combustion section 26, where the highly pressurized air is mixed with fuel and burned to provide combustion gases 66.

The combustion gases 66 are routed into the HP turbine 28 and expanded through the HP turbine 28 where a portion of thermal and/or of kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable gas turbine engine, such as, for example, turbofan engines, propfan engines, turbojet engines, and/or turboshaft engines.

Figure 2:
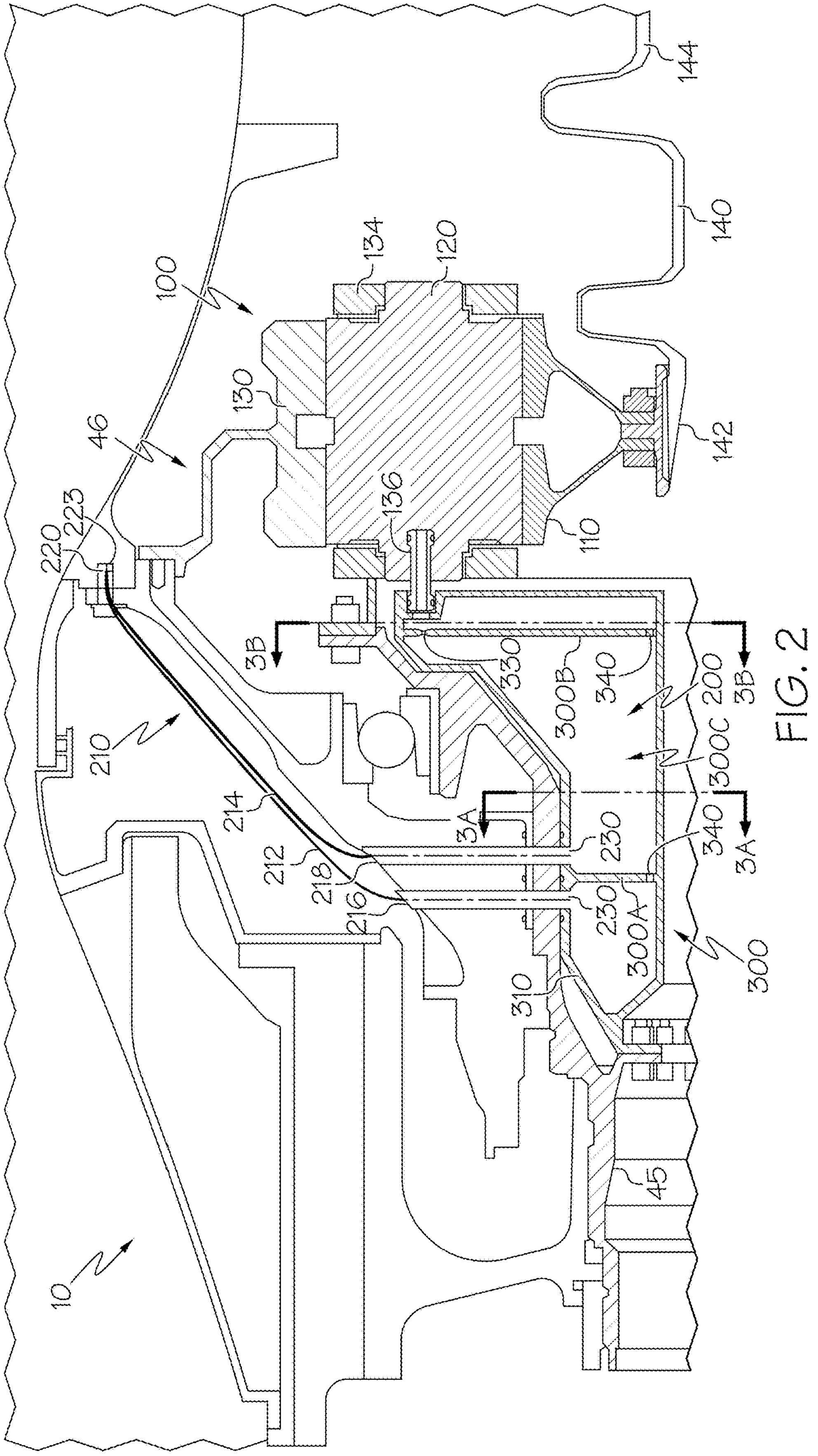
FIG. 2 schematically depicts a cross-sectional side view of a gearbox assembly for a turbine engine, taken along a centerline axis of the turbine engine, according to an embodiment of the present disclosure.

Referring now to FIG. 2, a cross-sectional side view of the gearbox assembly 46 is depicted. In these embodiments, the gearbox assembly 46 includes a planetary gear assembly 100, which is configured to generate torque in order to drive the fan 38 (FIG. 1) of the turbine engine 10. In these embodiments, the planetary gear assembly 100 may include a sun gear 110, a plurality of planet gears 120 (only one of which is visible in FIG. 2), and a ring gear 130. The planetary gear assembly 100 may further include a planet carrier 134, which may be configured to secure the plurality of planet gears 120 in their relative positions, as will be described in additional detail herein.

Referring still to FIG. 2, an input shaft 140 may be coupled to the sun gear 110, and may be configured to introduce mechanical power to the planetary gear assembly 100. As depicted in FIG. 2, the input shaft 140 may include a first end 142 and a second end 144, with the first end 142 being coupled to the sun gear 110 and the second end 144 being coupled to a power source (e.g. via a coupling and/or clutching mechanism) that allows the input shaft 140 to transmit torque from the power source to the planetary gear assembly 100. In these embodiments, it should be appreciated that the input shaft 140 may rotate at a speed determined by the power source, and the rotational motion of the input shaft 140 may drive the planetary gear assembly 100.

In some embodiments, to integrate the planetary gear assembly 100 into the turbine engine 10, the second end 144 of the input shaft 140 may be mechanically coupled to the turbine section 27 (FIG. 1) of the turbine engine 10. For example, the input shaft 140 may be mechanically coupled to the LP shaft 36 (FIG. 1). Accordingly, in these embodiments, the LP shaft 36 (FIG. 1) may act as the power source for the input shaft 140, such that rotation of the LP shaft 36 causes rotation of the input shaft 140. As will be described in additional detail herein, the rotation of the input shaft 140 may drive the various components of the planetary gear assembly 100.

Referring still to FIG. 2, the sun gear 110 may be centrally positioned within the planetary gear assembly 100 such that the remaining components (e.g., the plurality of planet gears 120) revolve and/or rotate about the sun gear 110. For example, the sun gear 110 may be a cylindrical gear having a plurality of outward facing teeth that are configured to engage the plurality of planet gears 120. Accordingly, in these embodiments, the sun gear 110 may be configured to distribute power from the input shaft 140 to the plurality of planet gears 120. As the sun gear 110 transfers power from the input shaft 140 to the plurality of planet gears 120, the sun gear 110 may cause the plurality of planet gears 120 to rotate about their axis and orbit (e.g., rotate) the sun gear 110.

In these embodiments, it should be appreciated that the size and tooth count of the sun gear 110 may impact the gear ratio of the planetary gear assembly 100. For example, the tooth count and size may impact the rotational speed and the torque conversion capabilities of the sun gear 110, which in turn may influence the rotation of the plurality of planet gears 120. In these embodiments, decreasing the tooth count of the sun gear 110 may allow the sun gear 110 to increase speed and decrease torque, while increasing the tooth count may allow the sun gear 110 to achieve an increased torque while reducing rotational speed.

Referring still to FIG. 2, and as has been described herein, the plurality of planet gears 120 may be coupled to the sun gear 110 such that rotational motion of the sun gear 110 is transferred to the plurality of planet gears 120. In these embodiments, the planet gears 120 may be relatively smaller gears (e.g., as compared to the sun gear 110) and may be mounted equidistantly around the sun gear 110. In these embodiments, each of the plurality of planet gears 120 may include a plurality of teeth, which may be configured to engage the teeth of the sun gear 110 and the ring gear 130, as will be described in additional detail herein. Although the planet gears 120 are described herein as being equidistantly spaced about the sun gear 110, it should be appreciated that, in some embodiments, the plurality of planet gears 120 may be variably spaced about the sun gear 110 without departing from the scope of the present disclosure.

In operation, the rotation and orbit of the plurality of planet gears 120 relative the sun gear 110 may generate an output of the planetary gear assembly 100. For example, the plurality of planet gears 120 may be capable of increasing or decreasing the rotational speed of the output of the planetary gear assembly 100. The operation of the planetary gear assembly 100 and output will be described in additional detail herein with reference to FIG. 4.

Referring still to FIG. 2, the plurality of planet gears 120 may be further coupled to the planet carrier 134, which may be configured to hold and/or support the plurality of planet gears 120. In these embodiments, the planet carrier 134 may allow each of the plurality of planet gears 120 to orbit the sun gear 110 while rotating about each of their own axes. To allow for each of the planet gears 120 to rotate about their own axes as the planet gears 120 orbit the sun gear 110, each of the plurality of planet gears 120 may be mounted to the planet carrier 134 using a bearing 136. In these embodiments, the planet carrier 134 may ensure that each of the plurality of planet gears 120 are positioned at a desired distance from the sun gear 110, while the bearing 136 upon which each of the planet gears 120 is mounted allows for the planet gears 120 to rotate about their own axes. As described in more detail herein, the bearing 136 extends from each of a respective one of the plurality of planet gears 120 and into a reservoir 300 of the lubricant transfer unit 200. Accordingly, lubricant may flow from the reservoir 300 and each of the plurality of planet gears 120 through a respective one of the bearings 136.

In the embodiments described herein, the bearings 136 may be needle bearings, roller bearings (e.g., tapered roller bearings, etc.), ball bearings, or any other similar bearing capable of allowing the plurality of planet gears 120 to rotate about their axes. It should be appreciated that the bearings 136 may facilitate smooth rotation of the planet gears 120, and may be further configured to withstand the radial and/or axial loads experienced by the plurality of planet gears 120 during operation of the planetary gear assembly 100. In addition, the bearings 136 may further aid in maintaining alignment of the plurality of planet gears 120 during operation of the planetary gear assembly 100, which may ensure that the plurality of planet gears 120 maintain proper meshing with the sun gear 110 and are able to efficiently transfer power during operation.

As further illustrated in FIG. 2, the plurality of planet gears 120 may be further configured to interface with the ring gear 130. In these embodiments, the ring gear 130 may be an annular gear, or any other similar gear, having a plurality of teeth on an interior surface of the gear for engaging the plurality of planet gears 120. As depicted in FIG. 2, the ring gear 130 may encircle that planetary gear set (e.g., the plurality of planet gears 120 and sun gear 110) such that the ring gear 130 acts as a housing. In these embodiments, the ring gear 130 may be a stationary member, while the sun gear 110, which is driven by the input shaft 140, drives the plurality of planet gears 120 to transmit power, as will be described herein.

Referring still to FIG. 2, the fan shaft 45 may be mechanically coupled to the planet carrier 134, which may be used to rotate the fan shaft 45. In these embodiments, with the ring gear 130 being stationary, the rotation of the plurality of planet gears 120 may cause the planet carrier 134 to rotate, with the rotation of the planet carrier 134 driving the fan shaft 45. It should be appreciated that, in the embodiments described herein, the configuration of the fan shaft 45 may be determined based on a desired gear ratio and power transfer efficiency within the planetary gear assembly 100.

Referring still to FIG. 2, the fan shaft 45 may be further coupled to the fan 38 (FIG. 1), such that rotation of the fan shaft 45 drives rotation of the fan 38 (FIG. 1) about the centerline axis 12. In the embodiments described herein, the fan shaft 45 may include a cylindrical rod, or any other similarly shaped shaft, formed of a material having a strength sufficient to withstand the torque and load transmitted by the fan shaft 45 (e.g., steel, other similar alloys, etc.).

In the embodiments described herein, it should be appreciated that the speed at which the various components of the planetary gear assembly 100 rotate and the torque that is generated and transmitted across the planetary gear assembly 100 may be a function of the gear ratio within the planetary gear assembly 100 and the power input into the planetary gear assembly 100 (e.g., via the turbine section 27, as depicted in FIG. 1). Accordingly, it may be possible to adjust various features of the planetary gear assembly 100 (e.g., size and tooth count of the sun gear 110, planet gears 120, ring gear 130, etc.) as described herein to optimize the efficiency of the gearbox assembly 46 for a particular application.

Referring still to FIG. 2, to ensure that the various moving components of the gearbox assembly 46 remain properly lubricated during operation, the gearbox assembly 46 (FIG. 1) may further include a lubricant transfer unit 200 configured to supply a lubricant (e.g., oil, etc.) to the planetary gear assembly 100 and the fan shaft 45. In these embodiments, the lubricant transfer unit 200 is positioned about at least a portion of the fan shaft 45, such that the lubricant transfer unit is forwardly positioned relative the planetary gear assembly 100 and in a location which is insensitive to deflection and/or vibration caused by operation of the turbine engine 10. Furthermore, because the lubricant transfer unit 200 is positioned about the fan shaft 45, any lubricant leakage may be directed to the fan shaft 45 and used to lubricate the fan shaft bearing, as will be described in additional detail herein.

As further depicted in FIG. 2, the lubricant transfer unit 200 may include a plurality of lubricant lines 210, which may extend between a lubricant housing 220 and a plurality of interfaces 230 at a reservoir 300 of the lubricant transfer unit 200 configured to supply lubricant to the gearbox assembly 46. In these embodiments, the plurality of lubricant lines 210 and/or the lubricant housing 220 may include a plurality of pumps and/or valves 223 integrated into each of the plurality of lubricant lines 210 that may be configured to transfer lubricant from the lubricant housing 220 to the plurality of interfaces 230, as will be described in additional detail herein.

In these embodiments, the plurality of lubricant lines 210 may include a first lubricant supply line 212 and a second lubricant supply line 214 and a first lubricant supply conduit 216 and a second lubricant conduit 218 may be coupled to the first lubricant supply line 212 and second lubricant supply line 214, respectively. The first lubricant supply conduit 216 and second lubricant conduit 218 may act to fluidly couple the first lubricant supply line 212 and the second lubricant supply line 214 to the plurality of interfaces 230, as will be described in additional detail herein. For example, in these embodiments, the conduits (e.g., first lubricant conduit 216 and second lubricant conduit 218) may be formed in a reservoir 300 to ensure a sealed connection between the lubricant transfer unit 200 and the reservoir 300.

For example, the first lubricant supply line 212 and/or second lubricant supply line 214 may each be configured to provide lubricant to the various gears and/or bearings of the planetary gear assembly 100, as will be described in additional detail herein. It should be appreciated that the plurality of lubricant lines 210 may be formed of any material capable of withstanding high-pressure and/or temperatures, such as stainless steel, reinforced synthetic materials, or any other similar materials, and may be configured to be both durable and flexible enough to accommodate movement and vibrations generated by the turbine engine 10 during operation.

Referring still to FIG. 2, the plurality of lubricant lines 210 may further include mechanisms for controlling the pressure and flow rate of lubricant within the lubricant transfer unit 200. For example, the first lubricant supply line 212 and/or second lubricant supply line 214 may include a valve, pressure regulator, or other similar component configured to control a volume of lubricant within the lubricant transfer unit 200 as the planetary gear assembly 100 operates.

Although the plurality of lubricant lines 210 are depicted as including a first lubricant supply line 212 and a second lubricant supply line 214, it should be appreciated that the plurality of lubricant lines 210 may include any number of lubricant lines without departing from the scope of the present disclosure. For example, as will be described in additional detail herein, the lubricant transfer unit 200 may include a plurality of interfaces, and each of the plurality of interfaces may be associated with at least one of the plurality of lubricant lines 210.

Referring still to FIG. 2, and as previously described herein, the plurality of lubricant lines 210 extend from the lubricant housing 220 to the plurality of interfaces 230. In embodiments, the plurality of interfaces 230 are provided within the fan shaft 45. In other embodiments, the plurality of interfaces 230 are provided at an end of each of the lubricant conduits 216, 218 and mate with openings formed in the reservoir 300. In any event, upon rotation of the fan shaft 45 and the reservoir 300, the interfaces 230 align with the ends of the lubricant lines 210 and/or the lubricant conduits 216, 218 to ensure that lubricant can flow from the lubricant lines 210 into the reservoir 300. In these embodiments, the lubricant housing 220 may be configured to store the lubricant (e.g., oil, etc.) that circulates through the planetary gear assembly 100.

As further depicted in FIG. 2, the gearbox assembly 46 may further include a reservoir 300 configured to fluidly couple the lubricant transfer unit 200 to the planetary gear assembly 100. For example, in the embodiments described herein, the reservoir 300 may be configured to receive and/or store a lubricant from the lubricant transfer unit 200, and dispense the lubricant to various components of the planetary gear assembly 100, as will be described in additional detail herein.

In these embodiments, the reservoir 300 may include a body 310, such as a tubular body, which may be mounted on the fan shaft 45. Accordingly, the reservoir 300 may rotate with the fan shaft 45 as the fan shaft 45 is driven by the plurality of planet gears 120 and the ring gear 130, as has been described herein. As the reservoir 300 rotates with the fan shaft 45, lubricant housed within the reservoir 300 may be directed to particular gears and/or bearing within the planetary gear assembly 100. In these embodiments, the reservoir 300 may further include a plurality of walls 300A, 300B that define an internal cavity 300C in which lubricant that passes into the reservoir 300 is stored. As will be described in additional detail herein, walls 300A divide the reservoir 300 into a plurality of sectors configured to store lubricant and maintain the flow of lubricant to various components of the turbine engine 10 during operation.

Figure 3B:
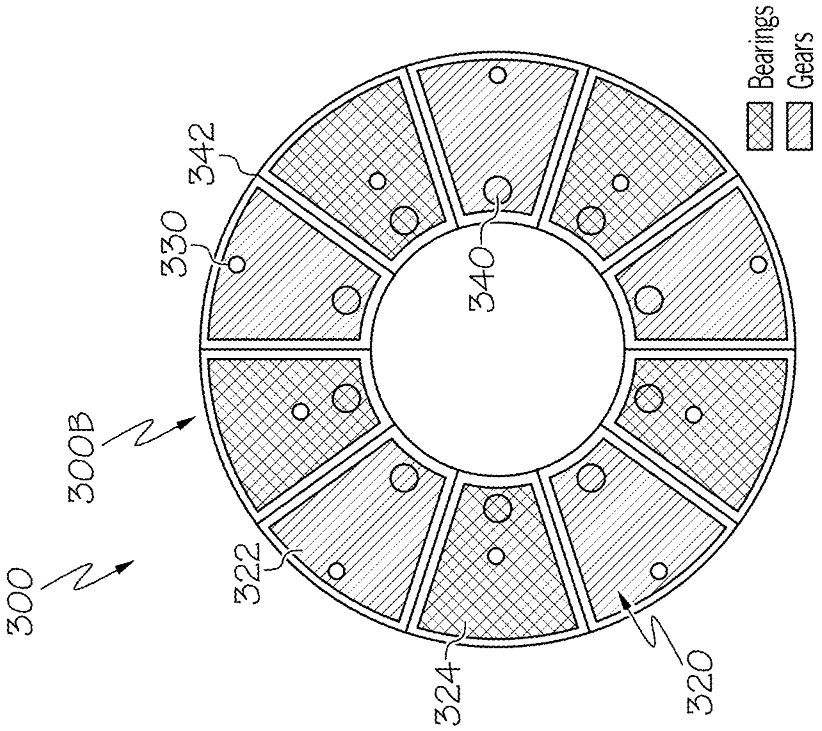
FIG. 3B schematically depicts a cross-sectional view of the reservoir of the gearbox of FIG. 2 along line 3B-3B, according to one or more embodiments of the present disclosure.
Figure 3A:
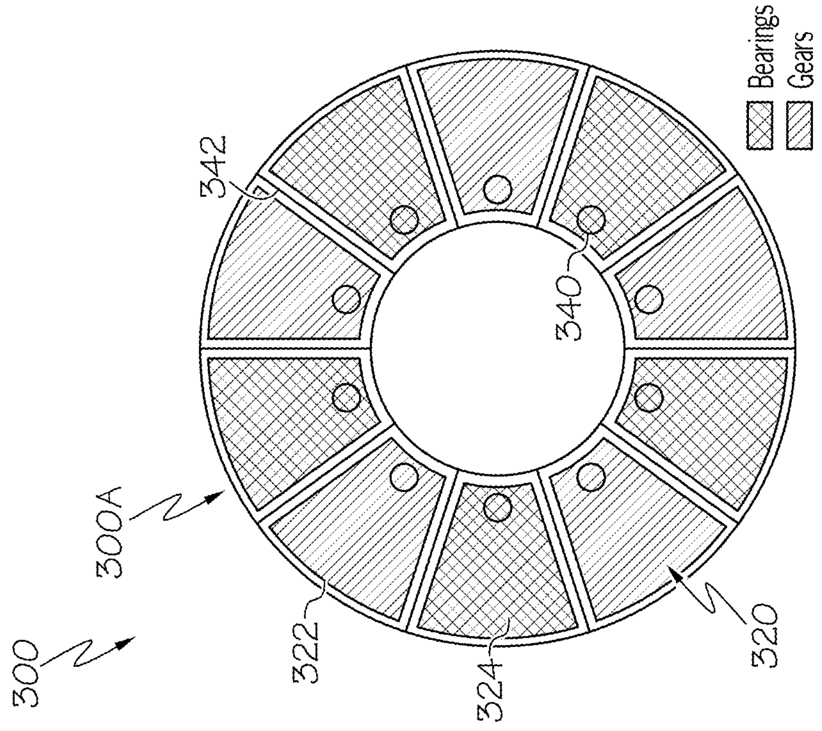
FIG. 3A schematically depicts a cross-sectional view of a reservoir of the gearbox of FIG. 2 along line 3A-3A, according to one or more embodiments of the present disclosure.

Referring now to FIGS. 3A and 3B, a cross-sectional view of the reservoir 300 is depicted illustrating the walls 300A, 300B. As illustrated in FIGS. 3A and 3B, the walls 300A, 300B of the reservoir 300 may be divided into a plurality of sectors 320, such as a plurality of angular sectors that are circumferentially spaced about the body 310. In these embodiments, the plurality of sectors 320 may act as segregated compartments configured to store and/or provide lubricant to particular components of the planetary gear assembly 100, as will be described in additional detail herein. As should be further appreciated, the plurality of sectors 320 may extend across a length of the reservoir 300, such that the plurality of sectors 320 include a plurality of upstream sectors and a plurality of downstream sectors (e.g., positioned downstream relative to the plurality of upstream sectors). In these embodiments, the positioning of the plurality of sectors 320 may aid in ensuring that each component in the planetary gear assembly 100 and/or fan shaft 45 (FIG. 2) receives a desired volume of lubricant without interfering with the lubrication requirements of other components.

For example, in these embodiments, the plurality of sectors 320 may include a plurality of bearing sectors 322 and a plurality of gear sectors 324. As should be appreciated, the plurality of bearing sectors 322 may be configured to provide lubricant to the bearing components within the planetary gear assembly 100 (e.g., the sun gear 110, the plurality of planet gears 120, the ring gear 130, etc.) while the plurality of gear sectors 324 may be configured to provide lubricant to the gear meshes within the planetary gear assembly (e.g., bearings 136, etc.). Furthermore, as shown in FIGS. 3A and 3B, the plurality of bearing sectors 322 and the plurality of gear sectors 324 may be alternately spaced about a circumference of the reservoir 300, such that each of the plurality of bearing sectors 322 is adjacent at least one of the plurality of gear sectors 324 on each side. Although the plurality of sectors 320 are depicted as being alternately positioned, it should be appreciated that, in these embodiments, the plurality of sectors 320 may have any positioning and/or alignment based on the configuration of the planetary gear assembly 100 and/or gearbox assembly 46 (FIG. 2)

As further depicted in FIGS. 3A and 3B, each of the plurality of sectors 320 may further include at least one orifice 330 and at least one opening 340. As shown in FIG. 3B, the position of the orifice 330 of the gear sectors 322 is located at a further radial distance from a center of the reservoir 300 relative to a position of the orifice 330 of the bearing sectors 324. In these embodiments, the at least one orifice 330 may be a calibrated orifice, which may include particular diameters and/or shapes that allow a predetermined volume of lubricant to pass through the orifices 330 in a given time. In these embodiments, the size and shape of the at least one orifice 330 may be determined based on a viscosity of lubricant received by the reservoir 300, a desired flow rate of the lubricant, and/or other operating conditions of the gearbox assembly 46. For example, although the at least one orifice 330 of each of the plurality of sectors 320 is depicted as being circular, it should be appreciated that the at least one orifice 330 may take any shape to achieve various lubricant flow characteristics.

Referring still to FIGS. 3A and 3B, and as described herein, the plurality of sectors 320 may each further include at least one opening 340. In these embodiments, the at least one opening 340 may be an overflow opening, which may be configured to manage a lubricant level (e.g., volume of lubricant) within each of the plurality of sectors 320. For example, as each of the plurality of sectors 320 is filled with lubricant, the lubricant level may rise until the lubricant reaches the at least one opening 340. Once the lubricant level reaches a predetermined height (e.g., the level of the at least one opening 340), excess lubricant may evacuate through the at least one opening 340, thereby maintaining a consistent lubricant level within each of the plurality of sectors 320. It should be appreciated that, in the embodiments described herein, a centrifugal field may push the lubricant outwardly in order to aid in evacuating the lubricant through the at least one opening 340.

In the embodiments described herein, the at least one opening 340 formed in each of the plurality of sectors 320 may ensure that each of the plurality of sectors 320 are filled with the lubricant during normal operating conditions of the turbine (e.g., when lubricant is actively supplied to the reservoir 300 via the lubricant transfer unit 200). Furthermore, the positioning of the at least one opening 340 of each of the plurality of sectors 320 is such that, in the event operation of the lubricant transfer unit 200 and/or turbine engine 10 is disrupted, lubricant may become trapped within a forward portion of the plurality of sectors 320. For example, it should be understood that, as the reservoir rotates, a centrifugal force may act upon the lubricant stored within the reservoir, such that the lubricant is forced radially outward towards a forward portion of each of the plurality of sectors 320. In these embodiments, the lubricant stored within each of the plurality of sectors 320 may be slowly fed, via a centrifugal effect, through the at least one orifice 330 formed in each of the plurality of sectors 320 as the reservoir rotates, such that lubricant may continue to be supplied to the planetary gear assembly 100 even in the event the lubricant transfer unit 200 and/or the turbine engine 10 experiences a malfunction.

Referring still to FIGS. 3A and 3B, the reservoir 300 may further include a plurality of dam members 342, which may be configured to separate and/or define each of the plurality of sectors 320. For example, in these embodiments, the plurality of dam member 342 may include a raised barrier or a series of raised barriers configured to restrict the flow of lubricant within each of the plurality of sectors 320. During normal operation of the turbine engine, the plurality of dam member 342 may ensure lubricant fed into the reservoir remains in a desired sector.

Figure 4:
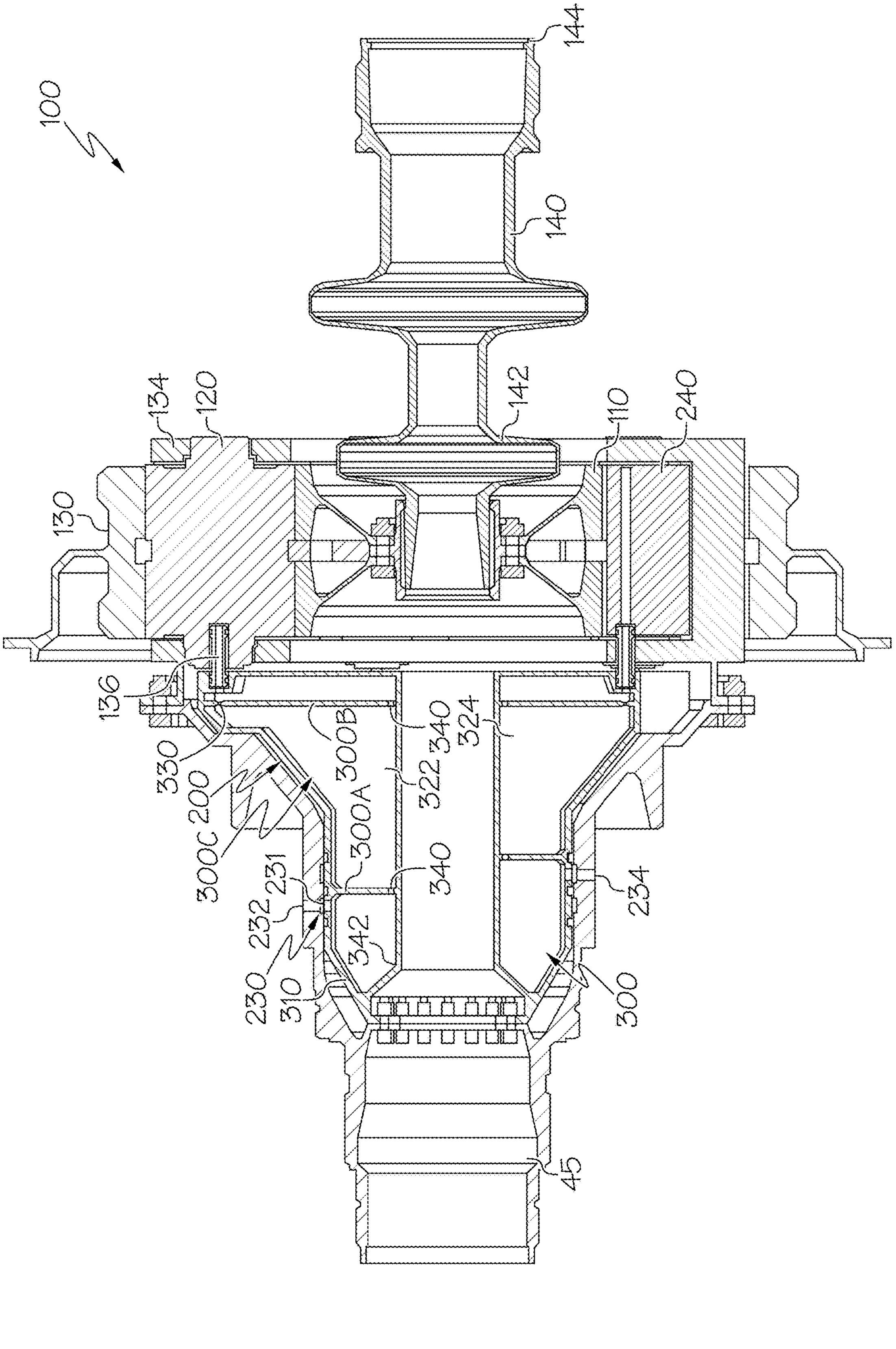
FIG. 4 schematically depicts a cross-sectional side view of the planetary gear assembly of FIG. 2, according to an embodiment of the present disclosure.

Referring now to FIG. 4, features of the planetary gear assembly 100 and the lubricant transfer unit 200 are depicted in additional detail. For example, as illustrated in FIG. 4, the lubricant transfer unit 200 may further include a plurality of interfaces 230. In these embodiments, the plurality of interfaces 230 may be used to fluidly couple the plurality of lubricant lines 210 (FIG. 2) to the reservoir 300, such that lubricant may be passed from the lubricant housing 220 (FIG. 2) to the plurality of sectors 320 formed within the body 310 of the reservoir 300.

In the embodiments described herein, each of the plurality of interfaces 230 may be associated with particular components of the reservoir 300 and/or planetary gear assembly 100, such that the lubricant transfer unit 200 may selectively supply lubricant to various components of the reservoir 300 and/or planetary gear assembly 100 and control the flow rate and volume of lubricant provided to each of the various components. In these embodiments, the plurality of interfaces 230 may be further sized and/or shaped to regulate a pressure of the lubricant being supplied to the reservoir 300 and/or planetary gear assembly 100. For example, in the embodiments described herein, excessive pressure may result in leakage through the lubricant transfer unit 200. However, by altering the size and/or shape of the plurality of interfaces 230 of the lubricant transfer unit 200, it may be possible to ensure that the lubricant entering the planetary gear assembly 100 is maintained at a desired pressure.

In the embodiments described herein, the plurality of interfaces 230 may be further configured to form a seal 231 with the reservoir 300. For example, in these embodiments, the plurality of interfaces 230 may be configured to adapt to a shape of the plurality of lubricant lines 210 and the conduits (e.g., first lubricant conduit 216 and second lubricant conduit 218) formed in the reservoir 300 to ensure a sealed connection between the lubricant transfer unit 200 and the planetary gear assembly 100. Furthermore, in some embodiments, the plurality of interfaces 230 may further include an O-ring, gasket, or other custom-molded component that forms the seal 231 with the reservoir 300. In these embodiments, the seal 231 ensures that lubricant does not leak and/or become contaminated during transfer of the lubricant to the reservoir 300.

Referring still to FIG. 4, the plurality of interfaces 230 of the lubricant transfer unit 200 may, in some embodiments, include a gear lubricant interface 234 and a bearing lubricant interface 232, with each of the bearing lubricant interface 232 and the gear lubricant interface 234 being configured to supply lubricant to the corresponding sectors of the plurality of sectors 320 of the reservoir 300. For example, the bearing lubricant interface 232 may be fluidly coupled to the plurality of bearing sectors 322 of the reservoir 300, such that the lubricant may be received by the plurality of bearing sectors 322 via the bearing lubricant interface 232. Similarly, the gear lubricant interface 234 may be configured to supply lubricant to the plurality of gear sectors 324, such that lubricant may be received by the plurality of gear sectors 324 via the gear lubricant interface 234.

As further depicted in FIG. 4, in some embodiments, the reservoir 300 may be fluidly coupled to a nozzle 240 that may be utilized to direct lubricant to particular areas within the planetary gear assembly 100. For example, the plurality of sectors 320 (e.g., the plurality of bearing sectors 322 and/or the plurality of gear sectors 324) may be fluidly coupled to the nozzle 240, such that, as lubricant passes through the at least one orifice 330 of each of the plurality of sectors, the lubricant is dispensed to the nozzle 240 rather than directly to the various gears and/or bearings of the planetary gear assembly 100. In these embodiments, the nozzle 240 may be focused at contact points between the sun gear 110, the planet gears 120, and the ring gear 130. For example, as depicted in FIG. 4, the nozzle 240 is positioned to supply lubricant to an area where the sun gear 110 contacts the plurality of planet gears 120. The nozzle 240 may be of particular benefit in high-speed and/or high-torque applications where thermal and mechanical loads acting on the gearbox and/or the planetary gear assembly 100 are substantial. In these demanding environments, the direction afforded by the nozzle 240 may ensure that the lubricant is disposed at specific locations within the gearbox and/or the planetary gear assembly 100.

Figure 5:
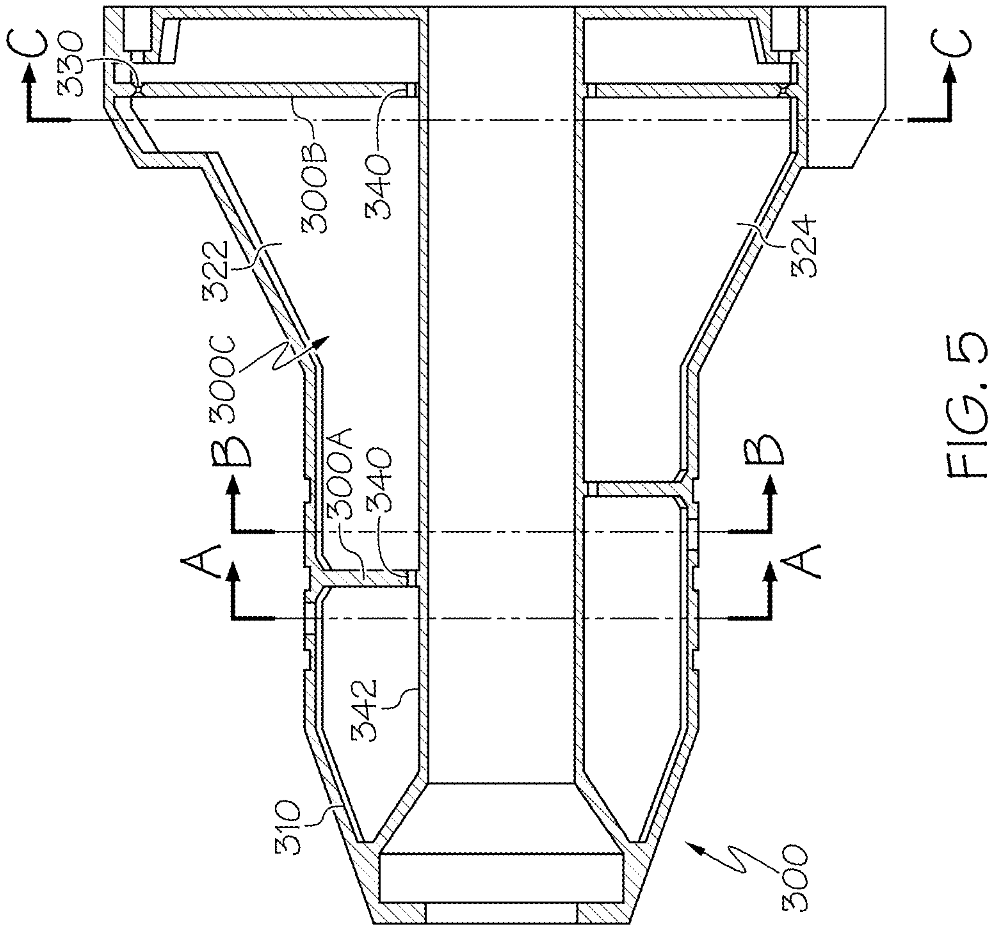
FIG. 5 schematically depicts a cross-sectional side view of the reservoir of the gearbox of FIG. 2 in additional detail, according to an embodiment of the present disclosure.
Figure 6C:
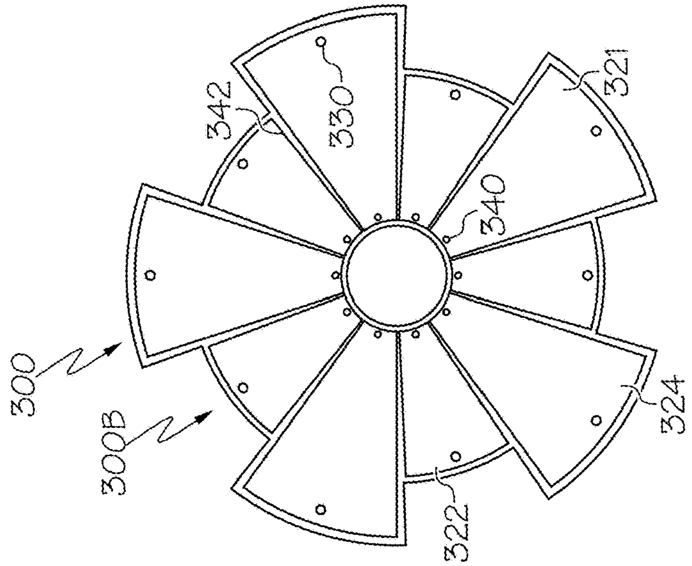
FIG. 6C schematically depicts a cross-sectional view of the reservoir of FIG. 5 along line 6C-6C, according to an embodiment of the present disclosure.
Figure 6B:
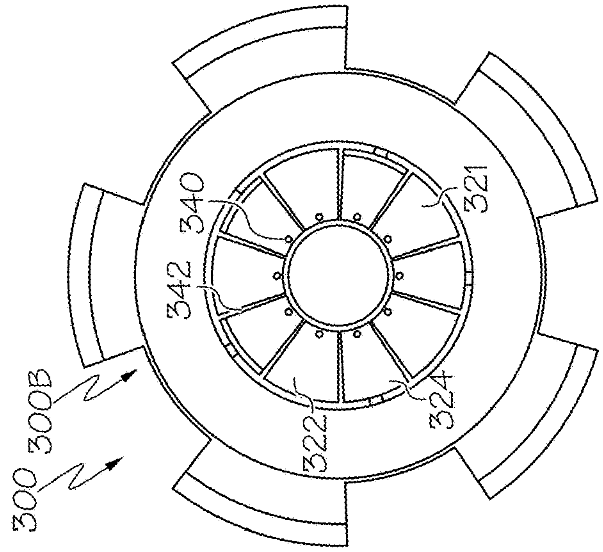
FIG. 6B schematically depicts a cross-sectional view of the reservoir of FIG. 5 along line 6B-6B, according to an embodiment of the present disclosure.
Figure 6A:
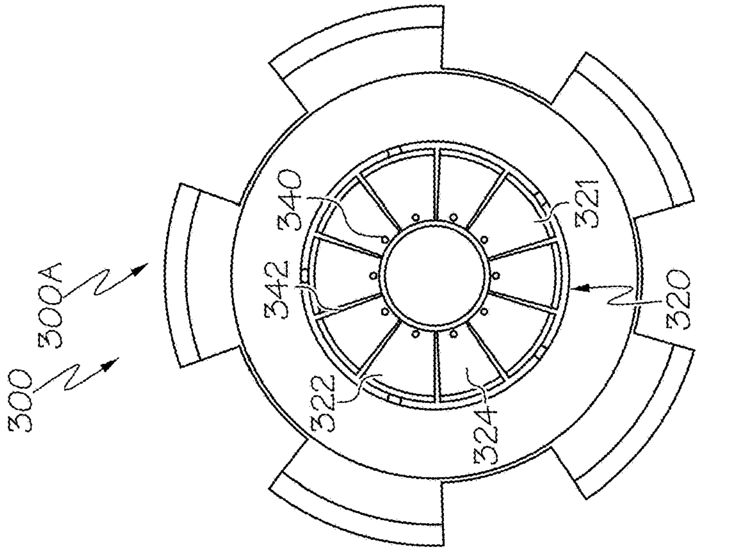
FIG. 6A schematically depicts a cross-sectional view of the reservoir of FIG. 5 along line 6A-6A, according to an embodiment of the present disclosure.

Turning now to FIGS. 5-6C, operation of the reservoir 300 will be described in additional detail. As illustrated in FIGS. 5-6C, and as described herein, the reservoir 300 may include a plurality of sectors 320 including a plurality of bearing sectors 322 and a plurality of gear sectors 324 defined by a plurality of dam members 342 extending between the plurality of bearing sectors 322 and the plurality of gear sectors 324. In these embodiments, the plurality of dam members 342 may act as wall members that divide and/or isolate each of the plurality of bearing sectors 322 from each of the plurality of gear sectors 324, thereby ensuring that a desired volume of lubricant is contained within each of the plurality of sectors 320. Furthermore, in these embodiments, the dam members 342 may ensure that each of the plurality of sectors 320 (e.g., each of the plurality of gear sectors 324 and each of the plurality of bearing sectors 322) maintains a volume of reserved lubricant, which may be utilized in the event of system failure and/or disruption to allow the turbine engine 10 to continue to operate. In the embodiments described herein, the plurality of dam members 342 may be formed of steel (e.g., stainless steel) or other advanced composite materials that are capable of withstanding high temperatures and provide resistance to chemical properties of the lubricant received by the reservoir 300.

In these embodiments, each of the plurality of bearing sectors 322 and each of the plurality of gear sectors 324 may include at least one orifice 330 and at least one opening 340, which may be used to dispense lubricant to particular components of the gearbox and maintain a predetermined and/or desired volume of lubricant within the sectors, respectively, as has been described herein. As depicted most clearly in FIGS. 6A-6C, the at least one orifice 330 and at least one opening 340 may be formed in each of the plurality of bearing sectors 322 and in each of the plurality of gear sectors 324 (e.g., between the plurality of dam members 342 defining the plurality of bearing sectors and gear sectors 322, 324).

In operation, each of the plurality of sectors 320 (e.g., the plurality of bearing sectors 322 and the plurality of gear sectors 324) is filled with a desired volume of lubricant. It should be appreciated that the volume of lubricant contained within each of the plurality of sectors 320 may be dependent on the configuration of the gear assembly which the reservoir 300 is being used to lubricant.

Referring still to FIGS. 5-6C, as the turbine engine operates, rotational motion is transferred via the gearbox assembly 46 to the fan shaft 45 in order to drive the fan 38 (FIG. 1). Because the reservoir 300 is mounted to the fan shaft 45, rotation of the fan shaft 45 may similarly cause the reservoir 300 to rotate.

As the reservoir 300 rotates, centrifugal forces may act on the lubricant stored within each of the plurality of bearing sectors 322 and each of the plurality of gear sectors 324, such that the lubricant within each of the plurality of bearing sectors 322 and each of the plurality of gear sectors 324 is forced radially outwards towards an outer perimeter of the sectors. As the lubricant is forced radially outward by the centrifugal force acting on the reservoir 300, the lubricant may flow through the at least one orifice 330 formed in each of the plurality of sectors 320.

In the embodiments described herein, the volume of lubricant contained by each of the plurality of sectors 320 may be further managed by the at least one opening 340 formed in each of the plurality of sectors 320. For example, and as described herein, during operation of the turbine engine, lubricant may continuously flow into the reservoir 300 by traversing the plurality of supply lines 210 and plurality of interfaces. In these embodiments, the at least one opening 340 formed in each of the plurality of sectors 320 may ensure that each of the plurality of sectors 320 is filled with lubricant, and may further represent a main lubricant passage to the planetary gear assembly 100 (e.g., from the lubricant lines 210, through the reservoir 300, and to the planetary gear assembly 100) under normal turbine engine 10 operating conditions. However, in the event of supply of lubricant to the reservoir 300 is interrupted (e.g., due to issues with the lubricant lines 210 or other turbine engine 10 failures, such as negative-g operation), the lubricant flow may act only through the at least one orifice 330 formed in each of the plurality of sectors 320 to ensure that a flow of lubricant is maintained, as will be described in additional detail herein.

Referring still to FIGS. 5-6C, the continuous rotation of the reservoir 300 during operation of the turbine engine may ensure that lubricant is consistently forced outwardly towards and/or through the at least one orifice 330 formed in each of the plurality of sectors 320. In these embodiments, it should be appreciated that, as the lubricant passes through the each of the plurality of sectors 320, the lubricant may be directed to particular components within the planetary gear assembly, as has been described herein. For example, lubricant that passes through the at least one orifice 330 of each of the plurality of bearing sectors 322 may be used to lubricate the various bearings of the planetary gear assembly 100, while lubricant that passes through the at least one orifice 330 in each of the plurality of gear sectors 324 may be used to lubricate the various gears of the planet gear assembly 100.

Referring now to FIGS. 2-6C collectively, it should be appreciated that, in some embodiments, the reservoir 300 may further act as an emergency lubrication system capable of providing lubricant to various components of the gearbox assembly 46 and fan shaft 45 in the event of a loss of lubricant supply pressure. For example, in the event that the lubricant transfer unit 200 is unable to transfer lubricant to the reservoir 300, the reservoir 300 may utilize the lubricant stored in each of the plurality of sectors 320 to continue lubricating the gearbox assembly 46, fan shaft 45 and planetary gear assembly 100. In these embodiments, the plurality of sectors 320 may include at least one lubricant reserve sector 321, which may be configured to maintain a lubricant supply that is utilized particularly for emergency lubricant purposes. For example, in these embodiments, the lubricant reserve sector 321 may be configured to store extra lubricant that may be utilized in the event the turbine engine 10 fails or is otherwise disrupted. The lubricant reservoir sector 321 may remain isolated from the remainder of the lubricant transfer unit 200 and planetary gear assembly 100 during normal operating conditions (e.g., via valves and/or dam members 342), but may be activated in the event of an emergency. Once the lubricant reserve sector 321 is activated, the lubricant stored within the lubricant reserve sector 321 may be directed towards various components of the turbine engine 10, as has been described herein.

Figure 7:
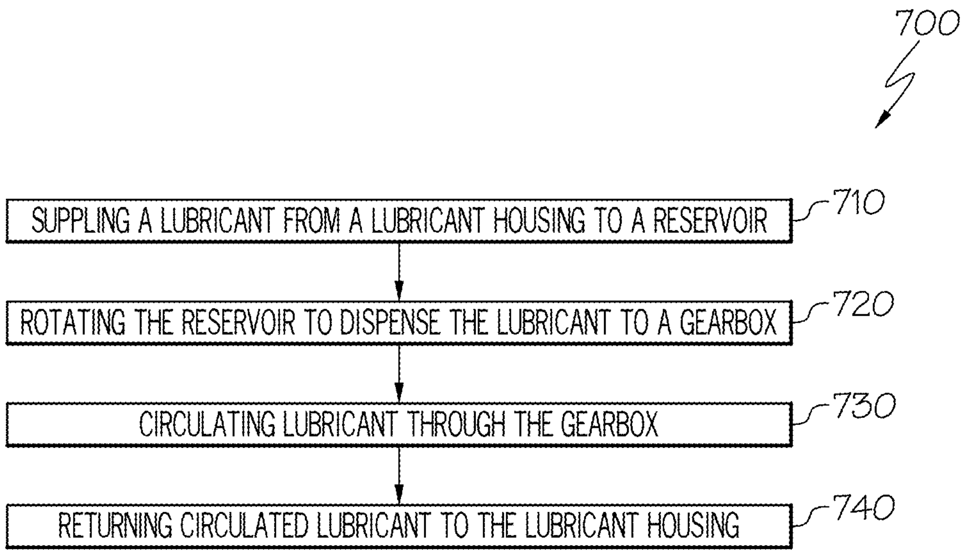
FIG. 7 schematically depicts a flow diagram of a method of supplying lubricant to a gearbox using the reservoir of FIG. 5, according to one or more embodiments shown and described herein.

Turning now to FIG. 7, a method 700 of supplying lubricant to a gearbox of a turbine engine using a reservoir is depicted. In these embodiments, the method may initially involve supplying a lubricant from a lubricant housing to a reservoir mounted on a fan shaft of the turbine engine via a plurality of lubricant lines, as shown at block 710. In these embodiments, the method step of supplying lubricant to the reservoir may further include providing the lubricant via a designated lubricant supply line. Furthermore, the method step may include supplying lubricant to a plurality of sectors within the reservoir, such as a plurality of gear sectors and a plurality of bearing sectors, via at least one opening formed in each of the plurality of sectors. For example, as depicted in FIGS. 2-6C, the lubricant may be supplied from lubricant housing 220 to the reservoir 300, as has been described herein.

With the lubricant supplied to the reservoir, the method may advance to block 720, which may involve rotating the reservoir to dispense the lubricant to a plurality of gears and/or a plurality of bearings positioned within the gearbox. In these embodiments, the plurality of sectors of the reservoir may each include at least one orifice, which may be used to fluidly couple the plurality of sectors to the plurality of gears and/or the plurality of bearings positioned within the gearbox. As the reservoir rotates, a centrifugal force may be generated that acts on the lubricant within the reservoir, which may force the lubricant radially outward through the at least one orifice in each of the plurality of sectors and to the plurality of gears and/or the plurality of bearings positioned within the gearbox. For example, as described herein with reference to FIGS. 2-6C, the reservoir 300 may be rotated such that a centrifugal force is generated on the lubricant stored within each of the plurality of sectors 320. In these embodiments, the centrifugal force may force the lubricant radially outward through at least one orifice 330 formed in each of the plurality of sectors 320.

With the lubricant dispensed through the reservoir and any excess lubricant drained from the reservoir, the method may advance to block 730, which may involve circulating the lubricant through the gearbox. In these embodiments, the lubricant circulating through the gearbox may act to cool the various components of the gearbox (e.g., gears, bearings, etc.) and may further allow for debris and contaminants within the gearbox to be removed. For example, as described herein with reference to FIGS. 2-6C, the lubricant may be circulated through the planetary gear assembly 100.

It should be further appreciated that, in these embodiments, lubricant may be continuously circulated through the gearbox even in the even that a failure and/or malfunction is experienced by the turbine engine. For example, the positioning of the at least one opening of each of the plurality of sectors is such that lubricant may become trapped within a forward portion of the plurality of sectors. In these embodiments, the lubricant stored within each of the plurality of sectors may be slowly fed, via a centrifugal effect, through the at least one orifice formed in each of the plurality of sectors as the reservoir rotates, such that lubricant may continue to be supplied to the gearbox.

Once the lubricant is circulated through the gearbox, the method may advance to block 740, which may involve returning the circulated lubricant to the lubricant housing. In these embodiments, once the circulated lubricant is returned to the lubricant housing, the lubricant housing may act to filter any debris or contamination from the circulated lubricant to generate a clean and/or recycled lubricant, as depicted at block 740. After the circulated lubricant has been properly cleansed, the method may finally involve recirculating the recycled lubricant into the gearbox, as shown at block 730, at which point the method steps described herein may be repeated until the lubricant is changed. For example, in these embodiments, the lubricant housing 220 may be used to filter debris and/or contamination from the circulated lubricant, at which point the clean and/or recycled lubricant may be recirculated to the planetary gear assembly 100 (e.g., via the reservoir 300) using the plurality of lubricant supply lines 210.

In view of the foregoing, it is to be appreciated that defined herein are turbine engines, reservoirs, and methods of lubricating gearboxes in turbine engines. As has been described herein, the rotating design of the reservoir (e.g., due to the mounting of the reservoir on the fan shaft) allows the reservoir to leverage centrifugal force to ensure consistent lubrication of each of the plurality of gears and the plurality of bearing in the gearbox, regardless of operational conditions. Furthermore, because the reservoir is configured to store a desired and/or predetermined volume of lubricant, the reservoir may be utilized as an emergency lubrication system in the event of a mechanical and/or electrical failure of other components of the gearbox and/or turbine engine. In particular, the compartmentalized sectors of the reservoir may allow for a steady supply of lubricant to be fed to various components, thereby enhancing reliability and safety of the gearbox. In the embodiments described herein, the compartmentalized sectors may be further utilized to customize the flow and/or volume of lubricant provide to individual components of the gearbox. It should be further appreciated that, by integrating the reservoir directly onto the fan shaft, the reservoir optimizes space utilization within the gearbox.

The forward positioning of the lubricant transfer unit about the fan shaft of the turbine engine allows for easier access to the lubricant transfer unit during installation and maintenance, and further acts to protect the lubricant transfer unit from deflections and/or vibrations caused by the turbine engine during operation. Furthermore, because the lubricant transfer unit is positioned about the fan shaft of the turbine engine, any leakage of lubricant from the lubricant transfer unit during operation of the turbine engine may be scavenged and utilized to lubricate the fan shaft bearings, thereby reducing waste and improving the efficiency of the gearbox of the turbine engine. Furthermore, the disclosed reservoir may allow for a larger volume of emergency lubricant to be stored within the reservoir, such that the lubricant transfer unit may be capable of providing lubricant to the fan shaft and/or planetary gearbox of the turbine engine for an extended period of time during failure and/or disruption of the turbine engine. Integrating the emergency lubricant capacity into the reservoir may further aid in reducing the overall weight of the turbine engine, which may allow for enhanced fuel efficiency and performance. Further aspects of the embodiments described herein are provided by the subject matter of the following clauses:

A turbine engine comprising: a fan section including a fan; a fan shaft coupled to the fan, the fan shaft configured to rotate the fan; a turbine section including an input shaft; a lubricant housing; a planetary gear assembly coupled to the input shaft and the fan shaft, such that the planetary gear assembly transfers rotational motion from the input shaft to the fan shaft; a lubricant transfer unit including to a reservoir, the reservoir comprising: a body; a plurality of sectors angularly positioned about a circumference of the body, each of the plurality of sectors including at least one orifice and at least one opening, the orifices fluidly coupling the plurality of sectors to the planetary gear assembly, the openings permitting excess lubricant to evacuate each of the plurality of sectors; and a plurality of dams positioned between and defining each of the plurality of sectors.

The turbine engine of any preceding clause, wherein the plurality of sectors include a plurality of gear sectors configured to provide the lubricant to a plurality of gears of the planetary gear assembly.

The turbine engine of any preceding clause, wherein the plurality of sectors include a plurality of bearing sectors configured to provide the lubricant to a plurality of bearings of the planetary gear assembly.

The turbine engine of any preceding clause, wherein the reservoir is forwardly positioned relative the planetary gear assembly and between the planetary gear assembly and the fan of the turbine engine.

The turbine engine of any preceding clause, wherein the at least one orifice of each of the plurality of sectors is configured to control a flow rate of the lubricant as the lubricant passes between the reservoir and the planetary gear assembly.

The turbine engine of any preceding clause, wherein the plurality of sectors include a reserve sector configured to store the lubricant for emergency use.

The turbine engine of any preceding clause, further comprising a nozzle fluidly coupled to the at least one orifice of at least one of the plurality of sectors, the nozzle being configured to dispense the lubricant to the planetary gear assembly.

The turbine engine of any preceding clause, wherein the lubricant transfer unit includes a lubricant housing and a plurality of lubricant lines extending between the lubricant housing and the reservoir.

The turbine engine of any preceding clause, wherein at least one of the plurality of lubricant lines includes a valve for controlling a flow rate of lubricant passing between the reservoir and the planetary gear assembly.

The turbine engine of any preceding clause, wherein the planetary gear assembly and the fan section of the turbine engine shields the lubricant transfer unit from deflections caused by operation of the turbine engine.

A turbine engine comprising: a planetary gear assembly; a lubricant transfer unit including a reservoir, the reservoir comprising: a body; a plurality of sectors angularly positioned about a circumference of the body, the plurality of sectors include a plurality of gear sectors configured to provide the lubricant to a plurality of gears of the planetary gear assembly and a plurality of bearing sectors configured to provide the lubricant to a plurality of bearings of the planetary gear assembly; and a plurality of dams positioned between and defining each of the plurality of sectors.

The turbine engine of any preceding clause, wherein the reservoir is forwardly positioned relative the planetary gear assembly and between the planetary gear assembly and the fan of the turbine engine.

The turbine engine of any preceding clause, wherein at least one orifice is formed in each of the plurality of sectors and controls a flow rate of the lubricant as the lubricant passes between the reservoir and the planetary gear assembly.

The turbine engine of any preceding clause, wherein the plurality of sectors include a reserve sector configured to store the lubricant for emergency use.

The turbine engine of any preceding clause, further comprising a nozzle fluidly coupled to the at least one orifice of at least one of the plurality of sectors, the nozzle being configured to dispense the lubricant to the planetary gear assembly.

The turbine engine of any preceding clause, wherein the lubricant transfer unit includes a lubricant housing and a plurality of lubricant lines extending between the lubricant housing and the reservoir.

A method of supplying lubricant to a gearbox of a turbine engine comprising: supplying a lubricant from a lubricant housing to a reservoir mounted on a fan shaft of the turbine engine via a plurality of lubricant lines, the reservoir being segregated into a plurality of sectors; rotating the reservoir to dispense the lubricant to a plurality of gears or a plurality of bearings positioned within the gearbox; circulating the lubricant through the gearbox; and returning the circulated lubricant to the lubricant housing via the plurality of lubricant lines.

The method of any preceding clause, further comprising storing lubricant within each of the plurality of sectors formed in the reservoir.

The method of any preceding clause, further comprising ceasing supply of the lubricant to the reservoir; and rotating the reservoir, such that the lubricant is dispensed to the plurality of gears or to the plurality of bearings positioned within the gearbox via at least one orifice formed in each of the plurality of sectors.

The method of any preceding clause, wherein the method step of rotating the reservoir to dispense the lubricant further involves dispensing the lubricant through at least one orifice formed in each of the plurality of sectors.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A turbine engine comprising:

a fan section including a fan;

a fan shaft coupled to the fan, the fan shaft configured to rotate the fan;

a turbine section including an input shaft;

a planetary gear assembly coupled to the input shaft and the fan shaft, such that the planetary gear assembly transfers rotational motion from the input shaft to the fan shaft; and a lubricant transfer unit including a lubricant housing and a reservoir, the reservoir being forwardly positioned relative the planetary gear assembly and between the planetary gear assembly and the fan of the fan section, the reservoir comprising:

a body;

a plurality of sectors angularly positioned about a circumference of the body, each of the plurality of sectors including at least one orifice that fluidly couples a respective sector to the planetary gear assembly and at least one opening that permits excess lubricant to evacuate the respective sector; and a plurality of dams positioned between and defining each of the plurality of sectors.

2. The turbine engine of claim 1, wherein the plurality of sectors include a plurality of gear sectors configured to provide lubricant to a plurality of gears of the planetary gear assembly.

3. The turbine engine of claim 1, wherein the plurality of sectors include a plurality of bearing sectors configured to provide lubricant to a plurality of bearings of the planetary gear assembly.

4. The turbine engine of claim 1, wherein the at least one orifice of each of the plurality of sectors is configured to control a flow rate of lubricant as the lubricant passes between the reservoir and the planetary gear assembly.

5. The turbine engine of claim 1, wherein the plurality of sectors include a reserve sector configured to store lubricant for emergency use.

6. The turbine engine of claim 1, further comprising a nozzle fluidly coupled to the at least one orifice of at least one of the plurality of sectors, the nozzle being configured to dispense lubricant to the planetary gear assembly.

7. The turbine engine of claim 1, wherein the lubricant transfer unit further includes a plurality of lubricant lines extending between the lubricant housing and the reservoir.

8. The turbine engine of claim 7, wherein at least one of the plurality of lubricant lines includes a valve for controlling a flow rate of lubricant passing between the reservoir and the planetary gear assembly.

9. The turbine engine of claim 1, wherein the planetary gear assembly and the fan section of the turbine engine shields the lubricant transfer unit from deflections caused by operation of the turbine engine.

10. The turbine engine of claim 1, wherein the reservoir is mounted on the fan shaft.

11. A turbine engine comprising:

a fan section including a fan;

a planetary gear assembly; and a lubricant transfer unit including a reservoir that is forwardly positioned relative the planetary gear assembly and between the planetary gear assembly and the fan of the fan section, the reservoir comprising:

a body;

a plurality of sectors angularly positioned about a circumference of the body, the plurality of sectors include a plurality of gear sectors configured to provide lubricant to a plurality of gears of the planetary gear assembly and a plurality of bearing sectors configured to provide the lubricant to a plurality of bearings of the planetary gear assembly; and a plurality of dams positioned between and defining each of the plurality of sectors.

12. The turbine engine of claim 11, wherein at least one orifice is formed in each of the plurality of sectors and controls a flow rate of the lubricant as the lubricant passes between the reservoir and the planetary gear assembly.

13. The turbine engine of claim 12, further comprising a nozzle fluidly coupled to the at least one orifice of at least one of the plurality of sectors, the nozzle being configured to dispense the lubricant to the planetary gear assembly.

14. The turbine engine of claim 11, wherein the plurality of sectors include a reserve sector configured to store the lubricant for emergency use.

15. The turbine engine of claim 11, wherein the lubricant transfer unit includes a lubricant housing and a plurality of lubricant lines extending between the lubricant housing and the reservoir.

16. The turbine engine of claim 11, further comprising a fan shaft coupled to the fan that is configured to rotate the fan, the reservoir being mounted on the fan shaft.

17. A method of supplying lubricant to a gearbox of a turbine engine comprising:

supplying a lubricant from a lubricant housing to a reservoir mounted on a fan shaft of the turbine engine via a plurality of lubricant lines, the reservoir being segregated into a plurality of sectors;

rotating the reservoir to dispense the lubricant to a plurality of gears or a plurality of bearings positioned within the gearbox;

circulating the lubricant through the gearbox; and returning the lubricant to the lubricant housing via the plurality of lubricant lines.

18. The method of claim 17, further comprising storing lubricant within each of the plurality of sectors formed in the reservoir.

19. The method of claim 18, further comprising ceasing supply of the lubricant to the reservoir; and rotating the reservoir, such that the lubricant is dispensed to the plurality of gears or to the plurality of bearings positioned within the gearbox via at least one orifice formed in each of the plurality of sectors.

20. The method of claim 17, wherein the method step of rotating the reservoir to dispense the lubricant further involves dispensing the lubricant through at least one orifice formed in each of the plurality of sectors.

* * * * *